(12) United States Patent
Hirako

(10) Patent No.: US 9,126,510 B2
(45) Date of Patent: Sep. 8, 2015

(54) VEHICLE SEAT WITH BUILT-IN CUSHION AIRBAG DEVICE

(71) Applicant: Toyota Jidosha Kabushiki Kaisha, Toyota-shi Aichi-ken (JP)

(72) Inventor: Yutaka Hirako, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/299,122

(22) Filed: Jun. 9, 2014

(65) Prior Publication Data

US 2014/0361520 A1  Dec. 11, 2014

(30) Foreign Application Priority Data

Jun. 7, 2013  (JP) ................. 2013-120951

(51) Int. Cl.
   *B60R 21/207*   (2006.01)
   *B60N 2/427*    (2006.01)
   *B60R 21/233*   (2006.01)
   *B60R 21/231*   (2011.01)
   *B60R 21/2338*  (2011.01)

(52) U.S. Cl.
   CPC ........ *B60N 2/42763* (2013.01); *B60N 2/42718* (2013.01); *B60R 21/207* (2013.01); *B60R 2021/2078* (2013.01); *B60R 2021/23153* (2013.01); *B60R 2021/23324* (2013.01); *B60R 2021/23382* (2013.01)

(58) Field of Classification Search
   CPC  B60N 2/42763; B60R 21/231; B60R 21/207; B60R 2021/2078; B60R 2021/23324; B60R 2021/23153
   See application file for complete search history.

(56) References Cited

U.S. PATENT DOCUMENTS

| 6,364,348 | B1* | 4/2002 | Jang et al. .................. 280/730.2 |
| 6,752,454 | B2* | 6/2004 | Ruel et al. .................. 297/216.1 |
| 7,527,333 | B2* | 5/2009 | Suzuki et al. .............. 297/216.1 |
| 8,888,126 | B2* | 11/2014 | Nukaya et al. ............. 280/730.1 |
| 2006/0119149 | A1* | 6/2006 | Yoshikawa et al. ........ 297/216.1 |
| 2009/0206582 | A1* | 8/2009 | Kumagai et al. ............. 280/729 |
| 2012/0007407 | A1 | 1/2012 | Komamura et al. |
| 2013/0056964 | A1* | 3/2013 | Yamashita et al. ......... 280/730.1 |

FOREIGN PATENT DOCUMENTS

| EP | 1077154 A2 | 2/2001 |
| JP | 2001-239872 A | 9/2001 |
| JP | 2002-079862 A | 3/2002 |
| JP | 2007-168599 A | 7/2007 |
| JP | 2007-320389 A | 12/2007 |
| JP | 2008-162546 A | 7/2008 |
| JP | 2008-195202 A | 8/2008 |
| JP | 2012-016970 A | 1/2012 |

* cited by examiner

*Primary Examiner* — Drew Brown
(74) *Attorney, Agent, or Firm* — Gifford, Krass, Sprinkle, Anderson & Citkowski, P.C.

(57) ABSTRACT

A vehicle seat with a built-in cushion airbag device includes an inflator that produces gas by being activated; and a cushion airbag that is divided by a tether into a plurality of inflating portions including at least a rear-side inflating portion arranged on a seat lower side of a rear portion of a seat cushion, and a front-side inflating portion arranged to a seat front side of the rear-side inflating portion, and that inflates toward a seat upper side, with the front-side inflating portion becoming higher than the rear-side inflating portion, by the gas produced by the inflator being supplied.

11 Claims, 4 Drawing Sheets

VEHICLE SEAT WITH BUILT-IN CUSHION AIRBAG DEVICE

INCORPORATION BY REFERENCE

The disclosure of Japanese Patent Application No. 2013-120951 filed on Jun. 7, 2013 including the specification, drawings and abstract is incorporated herein by reference in its entirety.

BACKGROUND OF THE INVENTION

1. Field of the Invention

The invention relates to a vehicle seat with a built-in cushion airbag device.

2. Description of Related Art

In a vehicle seat described in Japanese Patent Application Publication No. 2008-162546 (JP 2008-162546 A), a cushion airbag is provided on a seat lower side of a seat portion (seat cushion), and this cushion airbag is divided into a front-side inflating portion and a rear-side inflating portion. When the vehicle is involved in a frontal collision, the front-side inflating portion and the rear-side inflating portion inflate, such that the buttocks and thighs of a seated occupant are pushed upward toward a seat upper side. As a result, the seated occupant is inhibited from slipping forward toward the seat front side under a lap belt (a so-called submarine phenomenon), such that the waist of the seated occupant remains restrained by the lap belt. Japanese Patent Application Publication No. 2007-168599 (JP 2007-168599 A), Japanese Patent Application Publication No. 2007-320389 (JP 2007-320389 A), Japanese Patent Application Publication No. 2008-195202 (JP 2008-195202 A), Japanese Patent Application Publication No. 2001-239872 (JP 2001-239872 A), Japanese Patent Application Publication No. 2012-016970 (JP 2012-016970 A), and Japanese Patent Application Publication No. 2002-079862 (JP 2002-079862 A) each describe a vehicle seat with a built-in cushion airbag device.

However, in the vehicle seat with a built-in cushion airbag device described above, the rear-side inflating portion inflates relatively large and pushes the buttocks of the seated occupant upward toward the seat upper side, so there is a tendency for a load placed on the neck of the seated occupant to increase. That is, when the buttocks of the seated occupant are pushed upward toward the seat upper side by the rear-side inflating portion, the upper body of the seated occupant tries to move toward the seat upper side, but the head of the seated occupant wants to stay in position due to inertial force. Therefore, the head of the seated occupant is displaced so as to fall toward the seat front side. As a result, the load placed on the neck of the seated occupant increases. Thus, the vehicle seat with a built-in cushion airbag device described above has room for improvement regarding this point.

SUMMARY OF THE INVENTION

The invention thus provides a vehicle seat with a built-in cushion airbag device, which enables the waist of a seated occupant to remain restrained by a lap belt, while a load placed on the neck of the seated occupant is reduced.

One aspect of the invention relates to a vehicle seat with a built-in cushion airbag device. This vehicle seat includes an inflator that produces gas by being activated; and a cushion airbag that is divided by a tether into a plurality of inflating portions including at least a rear-side inflating portion arranged on a seat lower side of a rear portion of a seat cushion, and a front-side inflating portion arranged to a seat front side of the rear-side inflating portion, and that inflates toward a seat upper side, with the front-side inflating portion becoming higher than the rear-side inflating portion, by the gas produced by the inflator being supplied.

In this aspect, the cushion airbag is divided by a tether into a plurality of inflating portions including at least a rear-side inflating portion and a front-side inflating portion. Also, the rear-side inflating portion is arranged on the seat lower side of the rear portion of the seat cushion, and the front-side inflating portion is arranged to the seat front side of the rear-side inflating portion. Also, when gas produced by the inflator is supplied to the cushion airbag, the cushion airbag inflates toward the seat upper side. As a result, the rear-side inflating portion mainly pushes the buttocks of a seated occupant up toward the seat upper side, and the front-side inflating portion mainly pushes the thighs of the seated occupant up toward the seat upper side.

When the buttocks of the seated occupant are pushed up, the upper body of the seated occupant tries to move toward the seat upper side, but the head of the seated occupant wants to stay in position due to inertial force. Therefore, the head of the seated occupant is displaced so as to fall toward the seat front side, by the upper body of the seated occupant moving toward the seat upper side. In other words, a moment force that falls toward the seat front side is generated in the head of the seated occupant. As a result, the load placed on the neck of the seated occupant increases, so the value of neck injury criteria (NIJ) may increase.

Here, the cushion airbag inflates toward the seat upper side such that the front-side inflating portion becomes higher than the rear-side inflating portion. In other words, when the cushion airbag inflates, a portion of the cushion airbag on the seat rear side will be lower than a portion of the cushion airbag on the seat front side. Therefore, the buttocks of the seated occupant are inhibited from being excessively pushed upward by the rear-side inflating portion when the cushion airbag inflates. Consequently, the waist of the seated occupant is able to move toward the seat upper side (i.e., a lap belt side), while the head of the seated occupant is inhibited from falling toward the seat front side due to inertial force. As a result, the load placed on the neck of the seated occupant is able to be reduced.

Moreover, when the cushion airbag is inflated, the height of the front-side inflating portion is higher than the height of the rear-side inflating portion, as described above, so mainly the thighs of the seated occupant are pushed up toward the seat upper side. Therefore, the body of the seated occupant is inhibited from slipping forward toward the seat front side under the lap belt (a so-called submarine phenomenon) when the vehicle is involved in a frontal collision. Hence, the waist of the seated occupant is able to remain restrained by the lap belt. As a result, the waist of the seated occupant is able to remain restrained by the lap belt, while the load placed on the neck of the seated occupant is reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
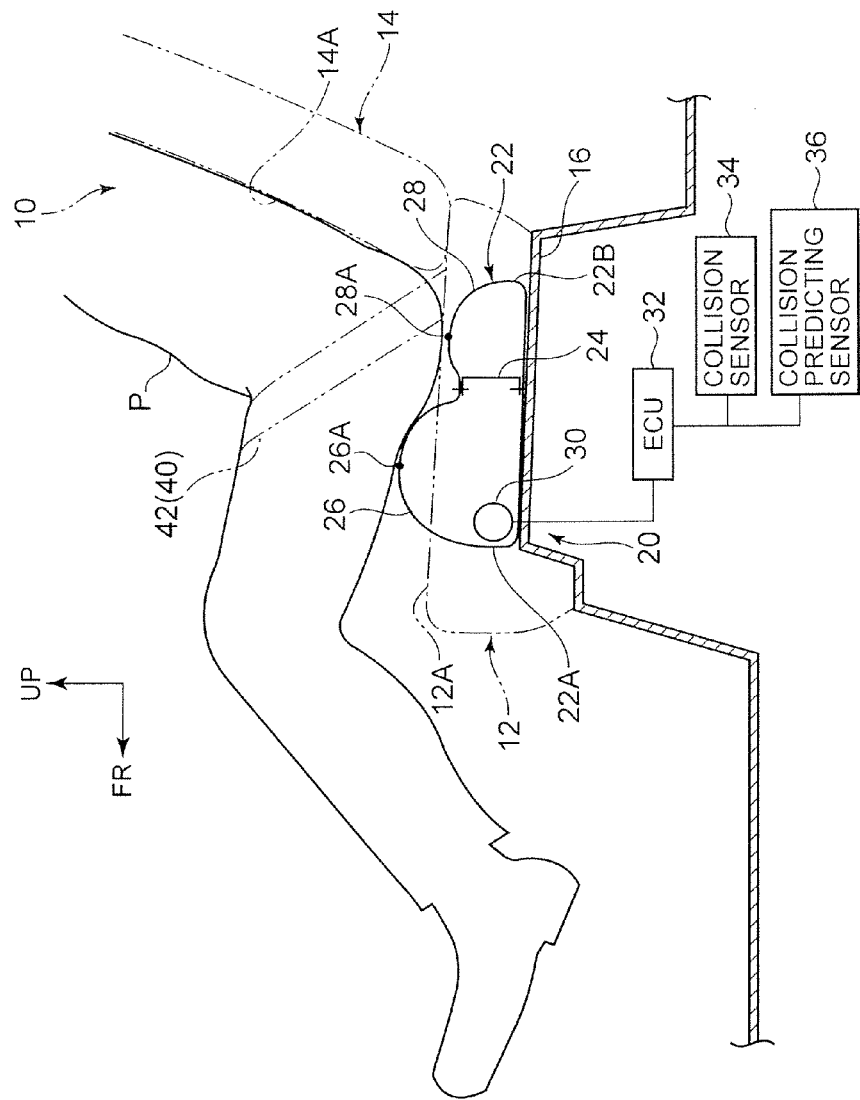
FIG. 1 is a sectional view showing a frame format of an inflated cushion airbag built into a vehicle seat according to one example embodiment of the invention, viewed from the left of the seat.

Hereinafter, a vehicle seat 10 with a built-in cushion airbag device 20 according to example embodiments of the invention will be described with reference to the accompanying drawings. In the drawings, arrow FR indicates a direction in front of a seat, arrow RH indicates a direction to the right of the seat (i.e., one side in a seat width direction), and arrow UP indicates a direction upward with respect to the seat. Also, these front, right, and upward directions with respect to the seat match front, right, and upward directions with respect to a vehicle, respectively. Moreover, in sectional views of a cushion airbag 22 used in the cushion airbag device 20, spaces between members are shown exaggerated so that the structure of each member is clear.

Figure 2:
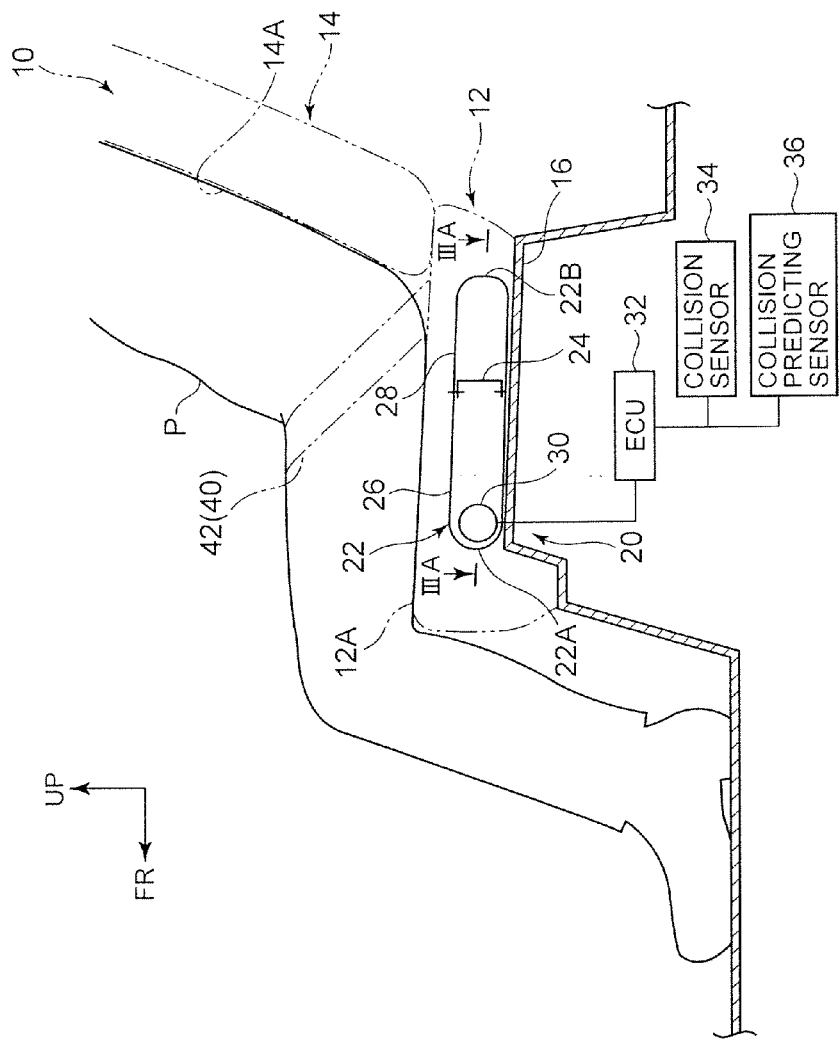
FIG. 2 is a sectional view showing a frame format of the cushion airbag shown in FIG. 1 before inflation, viewed from the left of the seat.

As shown in FIG. 2, the vehicle seat 10 is used as a rear seat arranged in a rear portion in a cabin of a vehicle (automobile). This vehicle seat 10 includes a seat cushion 12 that supports the buttocks and thighs of a seated occupant P, and a seat back 14 that supports the back of the seated occupant P.

The seat cushion 12 is arranged on an upper portion of a rear floor panel 16 of the vehicle, and is arranged substantially horizontal extending in a vehicle width direction. The seat back 14 is arranged upright on a rear end portion of the seat cushion 12. Also, the cushion airbag device 20 is built into the seat cushion 12. The cushion airbag device 20 includes the cushion airbag 22 and an inflator 30.

Figure 3A:
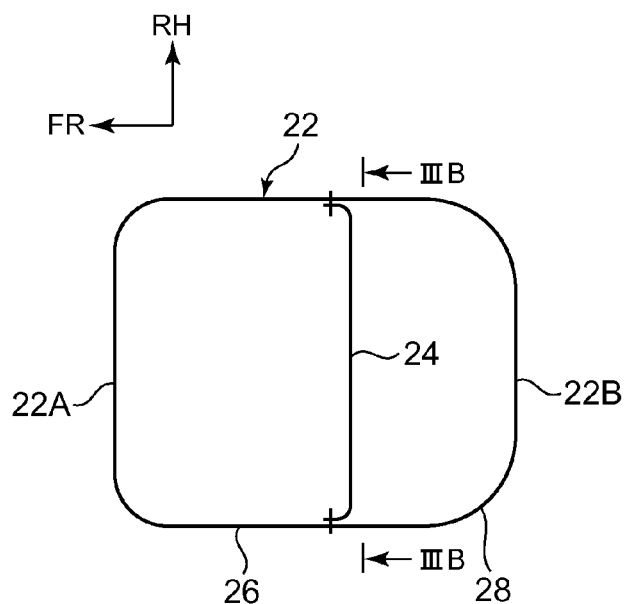
FIG. 3A is an enlarged sectional view (a sectional view taken along line IIIA-IIIA in FIG. 2) showing a frame format of the cushion airbag shown in FIG. 2, viewed from above the seat.
Figure 3B:
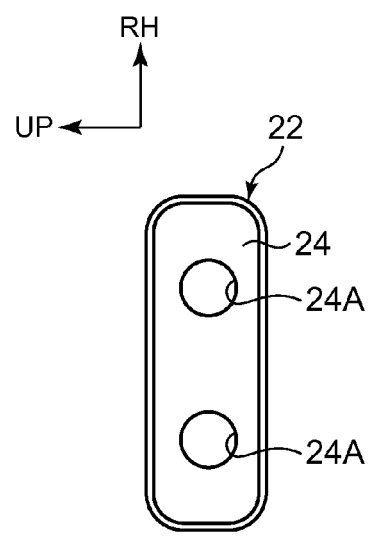
FIG. 3B is a sectional view (a sectional view taken along line IIIB-IIIB in FIG. 3A) showing a frame format of the inside of the cushion airbag shown in FIG. 3A, viewed from the rear of the seat.

The cushion airbag 22 is formed in a generally rectangular shape when viewed from above, and is arranged on the rear floor panel 16 or on a cushion pan, not shown, of the seat cushion 12 in an expanded state, on a seat lower side of the seat cushion 12. A tether 24 is provided inside this cushion airbag 22. The cushion airbag 22 is divided in a seat longitudinal direction (i.e., seat front-rear direction) by this tether 24. More specifically, as shown in FIGS. 3A and 3B, the tether 24 is formed in a generally long strip, and is arranged with the seat width direction as the length direction. An outer peripheral portion of the tether 24 is sewn to the cushion airbag 22. That is, the tether 24 is provided continuous in the width direction of the cushion airbag 22. A portion of the cushion airbag 22 that is divided by the tether 24, which is on a seat front side, serves as a front-side inflating portion 26, and a portion of the cushion airbag 22 on a seat rear side serves as a rear-side inflating portion 28.

Further, as shown in FIG. 1, a position of an upper end portion 26A of the front-side inflating portion 26 is set so as to be higher than an upper surface 12A of the seat cushion 12 when the cushion airbag 22 is inflated (i.e., is in an inflated state). Also, in this state, a position of an upper end portion 28A of the rear-side inflating portion 28 is set so as to be lower than the upper surface 12A of the seat cushion 12. That is, the height of the front-side inflating portion 26 is set so as to be higher than the height of the rear-side inflating portion 28 when the cushion airbag 22 is inflated. A weak portion, not shown, is formed in a cover of the seat cushion 12. This weak portion tears from the expansion force of the front-side inflating portion 26, and the upper end portion 26A of the front-side inflating portion 26 protrudes up toward the seat upper side with respect to the upper surface 12A of the seat cushion 12.

Also, the tether 24 is arranged to the seat rear side of a seat longitudinal direction center portion of the cushion airbag 22. In other words, a length of the front-side inflating portion 26 in the seat longitudinal direction (i.e., the length from a front end 22A of the cushion airbag 22 to the tether 24) is set longer than a length of the rear-side inflating portion 28 in the seat longitudinal direction (i.e., the length from the tether 24 to a rear end 22B of the cushion airbag 22). As a result, a "portion of the cushion airbag on the seat rear side" in the invention refers to a portion of the cushion airbag 22 that is to the seat rear side of the seat longitudinal direction center portion of the cushion airbag 22. Moreover, a plurality of communicating holes 24A (see FIG. 3B) are formed in the tether 24, and the inside of the front-side inflating portion 26 is communicated with the inside of the rear-side inflating portion 28 by these communicating holes 24A.

Moreover, in the seat longitudinal direction, a position of the rear end 22B of the cushion airbag 22 is substantially aligned with a position of a front surface 14A of (a lower end portion of) the seat back 14 (see FIGS. 1 and 2). Therefore, the rear-side inflating portion 28 is arranged on a seat lower side of a rear portion of the seat cushion 12 (i.e., on a seat lower side of a portion to the seat rear side of the seat longitudinal direction center portion in a seating area of the seat cushion 12). As a result, when the cushion airbag 22 is inflated, the rear-side inflating portion 28 mainly pushes the buttocks of the seated occupant P up, and the front-side inflating portion 26 mainly pushes the thighs of the seated occupant P up.

The inflator 30 is formed in a generally circular cylindrical shape, and is housed inside the front-side inflating portion 26. Also, when the inflator 30 is activated, gas is produced by the inflator 30, and this gas is supplied into the front-side inflating portion 26, as well as into the rear-side inflating portion 28 via the communicating holes 24A in the tether 24.

Also, the inflator 30 is electrically connected to an ECU 32 of the vehicle. This ECU 32 is electrically connected to a collision sensor 34 and a collision predicting sensor 36. The inflator 30 is configured to activate according to control by the ECU 32, when the ECU 32 detects a frontal collision of the vehicle or predicts a frontal collision of the vehicle based on signals output from the collision sensor 34 and the collision predicting sensor 36 to the ECU 32.

Moreover, a seatbelt 40 that forms a portion of a seatbelt device, not shown, is fastened across the body of the seated occupant P, such that the body of the seated occupant P is restrained by the seatbelt 40. This seatbelt device is configured as a so-called three-point seatbelt, with the waist of the seated occupant P being restrained by a lap belt 42 of the seatbelt 40, and the upper body of the seated occupant P being restrained by a shoulder belt, not shown, of the seatbelt 40.

FIG. 2 is a view showing a frame format of the cushion airbag 22 having a thickness in the vertical direction in order to facilitate understanding of the cushion airbag 22, but in actuality, the cushion airbag 22 is installed in the seat cushion 12 (installed on the rear floor panel 16) in a state with upper and lower airbag base cloths laid one on top of the other.

Next, the operation and effects of this example embodiment will be described.

In the vehicle seat 10 structured as described above, the inflator 30 is activated according to control by the ECU 32 when the ECU 32 detects a frontal collision of the vehicle or predicts a frontal collision of the vehicle, based on signals output from the collision sensor 34 and the collision predicting sensor 36 to the ECU 32. Consequently, gas is produced by the inflator 30, and this gas is supplied into the front-side inflating portion 26 of the cushion airbag 22. As a result, the front-side inflating portion 26 inflates toward the seat upper side, and the thighs of the seated occupant P are pushed up toward the seat upper side.

Also, the gas supplied into the front-side inflating portion 26 is supplied into the rear-side inflating portion 28 of the cushion airbag 22 via the communicating holes 24A in the tether 24. As a result, the rear-side inflating portion 28 inflates toward the seat upper side, and the buttocks of the seated occupant P are pushed up toward the seat upper side.

When the buttocks of the seated occupant P are pushed upward, the upper body of the seated occupant P tries to move toward the seat upper side, but the head of the seated occupant P wants to stay in position due to inertial force. Therefore, the head of the seated occupant P is displaced so as to fall toward the seat front side, by the upper body of the seated occupant P moving toward the seat upper side. In other words, a moment force that falls toward the seat front side is generated in the head of the seated occupant P. As a result, the load placed on the neck of the seated occupant P increases, so the value of neck injury criteria (NIJ) may increase.

Here, the height of the front-side inflating portion 26 is set to be higher than the height of the rear-side inflating portion 28 when the cushion airbag 22 is inflated (i.e., is in an inflated state). In other words, the height of the rear-side inflating portion 28 is set lower than the height of the front-side inflating portion 26. Therefore, the buttocks of the seated occupant P are inhibited from being excessively pushed upward by the rear-side inflating portion 28 when the cushion airbag 22 inflates. Consequently, the waist of the seated occupant P is able to move toward the seat upper side (i.e., the lap belt 42 side), while the head of the seated occupant P is inhibited from falling toward the seat front side due to inertial force. As a result, the load placed on the neck of the seated occupant P is able to be reduced, and thus, the value of the neck injury criteria (NIJ) is able to be lowered.

Moreover, when the cushion airbag 22 is inflated, the height of the front-side inflating portion 26 is higher than the height of the rear-side inflating portion 28, as described above, so mainly the thighs of the seated occupant P are pushed up toward the seat upper side. Therefore, the body of the seated occupant P is inhibited from slipping forward toward the seat front side under the lap belt 42 (a so-called submarine phenomenon) when the vehicle is involved in a frontal collision. Hence, the waist of the seated occupant P is able to remain restrained by the lap belt 42. As a result, the waist of the seated occupant P is able to remain restrained by the lap belt 42, while the load placed on the neck of the seated occupant P when the cushion airbag 22 inflates is able to be reduced.

Also, the cushion airbag 22 is divided into two inflating portions (i.e., the front-side inflating portion 26 and the rear-side inflating portion 28) by the tether 24, and this tether 24 is arranged to the seat rear side of the seat longitudinal direction center portion of the cushion airbag 22 when the cushion airbag 22 is inflated. Therefore, the height of the front-side inflating portion 26 with respect to the rear-side inflating portion 28 is able to be easily set when the cushion airbag 22 is formed by two inflating portions.

Moreover, the upper end portion 26A of the front-side inflating portion 26 when the cushion airbag 22 is inflated is arranged farther toward the seat upper side than the upper surface 12A of the seat cushion 12, and the rear-side inflating portion 28 when the cushion airbag 22 is inflated is arranged farther toward the seat lower side than the upper surface 12A of the seat cushion 12. Therefore, the submarine phenomenon described above can be further inhibited from occurring.

Also, the gas produced by the inflator 30 is supplied to the rear-side inflating portion 28 via the front-side inflating portion 26. Therefore, the rear-side inflating portion 28 starts to inflate after the front-side inflating portion 26 starts to inflate. As a result, the front-side inflating portion 26 of the cushion airbag 22, which pushes the seated occupant P upward a large amount, starts to inflate first, so the submarine phenomenon described above is able to be effectively inhibited from occurring. Moreover, there is no need to provide the inflator 30 for each of the front-side inflating portion 26 and the rear-side inflating portion 28, so an increase in the cost of the cushion airbag device 20 is able to be suppressed.

Further, the tether 24 is formed in a generally long strip and is provided continuous in the width direction of the cushion airbag 22. Therefore, a boundary portion (dividing portion) between the front-side inflating portion 26 and the rear-side inflating portion 28 is able to be formed continuous. As a result, the shapes of the front-side inflating portion 26 and the rear-side inflating portion 28 when these are inflated are able to be stabilized.

Also, the plurality of communicating holes 24A are formed in the tether 24, and the front-side inflating portion 26 is communicated with the rear-side inflating portion 28 by these communicating holes 24A. As a result, the timing at which the rear-side inflating portion 28 inflates is able to be easily adjusted by suitably changing the number, size or the like of the communicating holes 24A, for example. For example, the front-side inflating portion 26 having a large capacity and the rear-side inflating portion 28 having a small capacity can be made to be finish inflating substantially simultaneously by adjusting the opening area of the communicating holes 24A.

Further, the cushion airbag device 20 is built into a rear seat of a vehicle. Therefore, it is possible to inhibit the seated occupant P from being pushed up toward the roof when the vehicle is involved in a frontal collision, in a rear portion of a vehicle where the distance between the head of the seated occupant P and the roof of the vehicle is relatively short. As a result, distance between the head of the seated occupant P and the roof of the vehicle is able to be maintained when the vehicle is involved in a frontal collision.

In this example embodiment, the cushion airbag 22 is divided into two inflating portions (i.e., the front-side inflating portion 26 and the rear-side inflating portion 28) in the seat longitudinal direction by the tether 24. Alternatively, the cushion airbag 22 may be divided into three or more inflating portions in the seat longitudinal direction by the tether 24. For example, the rear-side inflating portion 28 may be divided in two in the seat longitudinal direction by adding a tether 24 inside of the rear-side inflating portion 28, such that the cushion airbag 22 is formed by three inflating portions. In this case, the length of the front-side inflating portion 26 in the seat longitudinal direction is set longer than the length of the rear-side inflating portion 28 in the seat longitudinal direction (i.e., than the length between the pair of tethers 24, or the length from the tether 24 to the rear end 22B of the cushion airbag 22). This configuration enables the height of the front-side inflating portion to be easily made higher than the height of the rear-side inflating portion.

The cushion airbag 22 may also be formed by three inflating portions, by adding the tether 24 inside of the front-side inflating portion 26, for example. In this case, it is sufficient that at least one of the heights inside the front-side inflating portion 26 that is divided into two be higher than the height of the rear-side inflating portion 28.

Figure 4A:
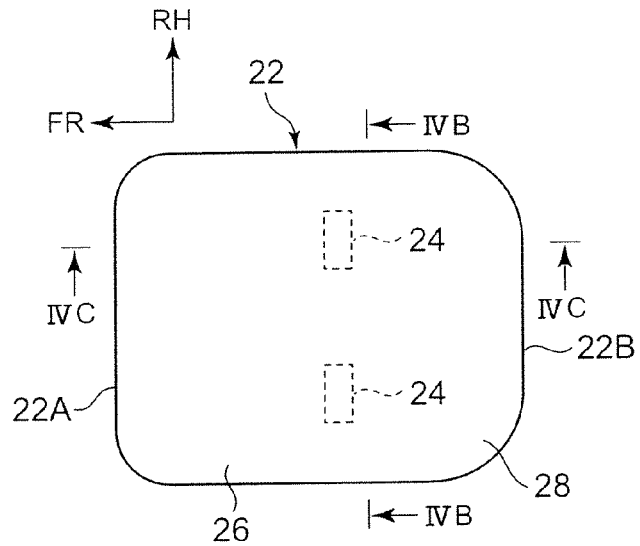
FIG. 4A is an enlarged plan view of another example of the cushion airbag shown in FIGS. 3A and 3B, viewed from above the seat.
Figure 4B:
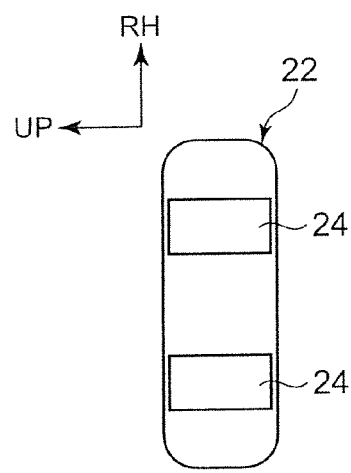
FIG. 4B is a sectional view (a sectional view taken along line IVB-IVB in FIG. 4A) showing a frame format of the inside of the cushion airbag shown in FIG. 4A, viewed from the rear of the seat.
Figure 4C:
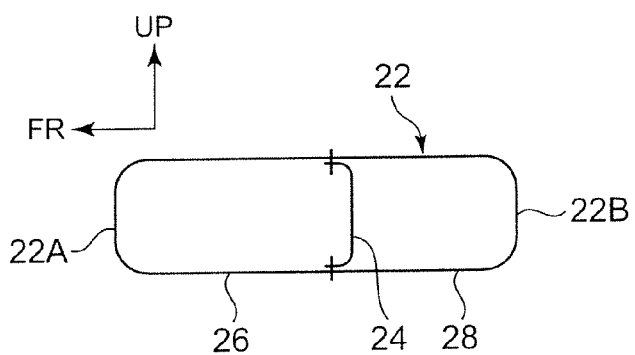
FIG. 4C is a sectional view (a sectional view taken along line IVC-IVC in FIG. 4A) showing a frame format of the inside of the cushion airbag shown in FIG. 4A, viewed from the left of the seat.

Further, in this example embodiment, the tether 24 is formed in a generally long strip, and is provided continuous in the width direction of the cushion airbag 22. Alternatively, as shown in FIGS. 4A to 4C, the tether 24 may be divided (here, the cushion airbag 22 includes two tethers 24), and the plurality of tethers 24 may be arranged lined up at predetermined intervals in the width direction of the cushion airbag 22. In this case, the front-side inflating portion 26 is communicated with the rear-side inflating portion 28 at the portion between the tethers 24, so the communicating holes 24A in the tether 24 may be omitted.

Also, in this example embodiment, when the cushion airbag 22 inflates, the weak portion of the cover of the seat cushion 12 tears and the upper end portion 26A of the front-side inflating portion 26 protrudes from the seat cushion 12. Alternatively, the weak portion may be omitted and the cushion airbag 22 may push the seat cushion 12 up.

Furthermore, the position of the tether 24 in the seat longitudinal direction may be set appropriately to the seat rear side of the seat longitudinal direction center portion of the cushion airbag 22, according to the vehicle seat of each type of vehicle.

Also, in this example embodiment, the gas produced by the inflator 30 is supplied to the rear-side inflating portion 28 via the front-side inflating portion 26. Alternatively, the gas produced by the inflator 30 may be supplied to the front-side inflating portion 26 via the rear-side inflating portion 28.

Further, in this example embodiment, the vehicle seat 10 is used as a rear seat of a vehicle, but the vehicle seat 10 may also be used as a front seat arranged in a front portion in a cabin of a vehicle. That is, the cushion airbag device 20 may be built into a seat cushion of a front seat. In this case, the cushion airbag device 20 is arranged between the seat cushion and the cushion pan of the front seat, for example.

What is claimed is:

1. A vehicle seat with a built-in cushion airbag device, comprising:
    an inflator that produces gas by being activated; and
    a cushion airbag having a tether arranged with a seat width direction as a length direction, the cushion airbag is divided by the tether into a plurality of inflating portions including at least a rear-side inflating portion arranged on a seat lower side of a rear portion of a seat cushion, and a front-side inflating portion arranged to a seat front side of the rear-side inflating portion, and that inflates toward a seat upper side, with the front-side inflating portion becoming higher than the rear-side inflating portion, by the gas produced by the inflator being supplied.

2. The vehicle seat with the built-in cushion airbag device according to claim 1, wherein
    the cushion airbag is divided into two of the inflating portions by the tether; and
    when the cushion airbag is inflated, the tether is arranged to a seat rear side of a seat longitudinal direction center portion of the cushion airbag.

3. The vehicle seat with the built-in cushion airbag device according to claim 1, wherein
    when the cushion airbag is inflated, a portion of the front-side inflating portion protrudes farther toward the seat upper side than an upper surface of the seat cushion; and
    when the cushion airbag is inflated, the rear-side inflating portion is arranged to the seat lower side of the upper surface of the seat cushion.

4. The vehicle seat with the built-in cushion airbag device according to claim 1, wherein
    the gas produced by the inflator is supplied to the rear-side inflating portion via the front-side inflating portion.

5. The vehicle seat with the built-in cushion airbag device according to claim 1, wherein
    a position of a rear end of the cushion airbag is substantially aligned with a position of a front surface of a lower end portion of a seat back.

6. The vehicle seat with the built-in cushion airbag device according to claim 1, wherein
    the cushion airbag device is built into a rear seat of a vehicle.

7. The vehicle seat with the built-in cushion airbag device according to claim 1, wherein
    a plurality of communicating holes are formed in the tether; and
    the front-side inflating portion is communicated with the rear-side inflating portion by the communicating holes.

8. The vehicle seat with the built-in cushion airbag device according to claim 7, wherein
    the inflator is housed inside of the front-side inflating portion; and
    the gas produced by the inflator is supplied into the front-side inflating portion, as well as into the rear-side inflating portion via the communicating holes in the tether.

9. The vehicle seat with the built-in cushion airbag device according to claim 1, wherein
    the tether is divided; and
    the divided plurality of tethers are arranged lined up at predetermined intervals in a width direction of the cushion airbag.

10. The vehicle seat with the built-in cushion airbag device according to claim 9, wherein
    the inflator is housed inside the front-side inflating portion; and
    the gas produced by the inflator is supplied into the front-side inflating portion, as well as into the rear-side inflating portion via a space between the tethers arranged lined up at predetermined intervals.

11. A vehicle seat with a built-in cushion airbag device, comprising:
    an inflator that produces gas by being activated; and
    a cushion airbag that is divided by a tether into a plurality of inflating portions including at least a rear-side inflating portion arranged on a seat lower side of a rear portion of a seat cushion, and a front-side inflating portion arranged to a seat front side of the rear-side inflating portion, and that inflates toward a seat upper side, with the front-side inflating portion becoming higher than the rear-side inflating portion, by the gas produced by the inflator being supplied, and when the cushion airbag is inflated, a portion of the front-side inflating portion protrudes farther toward the seat upper side than an upper surface of the seat cushion and the rear-side inflating portion is arranged to the seat lower side of the upper surface of the seat cushion.

* * * * *